United States Patent [19]

Moteki et al.

[11] Patent Number: 4,761,451

[45] Date of Patent: Aug. 2, 1988

[54] ACOUSTIC VIBRATION SHEET AND POLYPROPYLENE COMPOSITION FOR THE SAME

[75] Inventors: Tsutomu Moteki, Chibaken; Kunihiro Yamaguchi; Hisao Iizuka, both of Ichiharashi, all of Japan

[73] Assignee: Chisso Corporation, Osaka, Japan

[21] Appl. No.: 13,882

[22] Filed: Feb. 12, 1987

[30] Foreign Application Priority Data

Mar. 5, 1986 [JP] Japan ................................ 61-47930

[51] Int. Cl.$^4$ .......................... C08K 3/04; C08K 3/34; C08L 9/00; C08L 53/02
[52] U.S. Cl. ...................................... 524/505; 524/13; 524/449; 524/451; 524/496; 525/98
[58] Field of Search ...................... 525/88, 98; 524/505

[56] References Cited

U.S. PATENT DOCUMENTS

| 4,464,439 | 8/1984 | Castelein | 525/98 |
| 4,499,238 | 2/1985 | Iwata et al. | 525/98 |
| 4,582,871 | 4/1986 | Noro et al. | 524/505 |
| 4,604,421 | 8/1986 | Mitsuno et al. | 524/505 |

FOREIGN PATENT DOCUMENTS

| 0187442 | 11/1983 | Japan | 525/98 |
| 0022948 | 2/1984 | Japan | 525/98 |
| 0149939 | 8/1984 | Japan | 525/98 |
| 1095056 | 5/1986 | Japan | 525/98 |

Primary Examiner—Herbert J. Lilling
Attorney, Agent, or Firm—Leydig, Voit & Mayer

[57] ABSTRACT

A polypropylene based composition for an acoustic vibration sheet having superior acoustic adhesion and high-impact properties to those of conventional products, and an acoustic vibration sheet prepared from the composition are provided; the composition is obtained by blending 100 parts by weight of a polypropylene having a crystallinity of 0.94 or more and a Q value of 10 or more with 1 to 15 parts by weight of a thermoplastic styrene block copolymer rubber, and if necessary, further blending 10 to 40 parts by weight of a filler with the above-mentioned two components.

4 Claims, No Drawings

ACOUSTIC VIBRATION SHEET AND POLYPROPYLENE COMPOSITION FOR THE SAME

BACKGROUND OF THE INVENTION

1. Field of the Invention

This invention relates to an acoustic vibration sheet and a polypropylene composition for the same.

More particularly, it relates to an acoustic vibration sheet such as a speaker cone having improved acoustic characteristic, adhesion and high-impact strength and a polypropylene composition for the same.

2. Description of the Related Art

It has been known that polypropylene resins represented by polypropylene and compositions thereof are useful for acoustic vibration sheets.

For example, Japanese patent application laid-open Nos. Sho57-154994/1982 and Sho58-3499/1983 are directed to a product obtained by blending a definite quantity of mica having a specified shape with polypropylene or a copolymer of propylene with another monomer to make these material composite, whereby a considerably large effectiveness is observed.

However, acoustic vibration sheets produced from such compositions are still insufficient in the acoustic characteristic, adhesion and the high-impact strength thereof. An acoustic vibration sheet is disclosed in U.S. Pat. No. 4,190,746 which is a product obtained by laminating or coating low density polyethylene or non-crystalline polypropylene onto a sheet of general-purpose polypropylene or propylene copolymer. However, such a product is not satisfactory in the acoustic characteristic and adhesion thereof are still insufficient.

SUMMARY OF THE INVENTION

In view of the above-mentioned problems of the prior art relative to acoustic vibration sheets, the present inventors have carried out extensive research in order to find an acoustic vibration sheet of synthetic resins which is superior in the acoustic characteristic, adhesion and high-impact strength.

As a result, we have found that a composition obtained by blending a thermoplastic styrene copolymer rubber with a polypropylene having a specifired crystallinity and Q value in specified proportions or a composition further having a specified quantity of a filler blended with the above composition, and an acoustic vibration sheet molded from these compositions can solve the above-mentioned problems of the prior art.

As apparent from the foregoing, an object of the present invention is to provide an acoustic vibration sheet having superior acoustic characteristic, adhesion and high-impact properties to those of conventional products and a polypropylene based composition for preparation of the acoustic vibration sheet. Another object of the present invention is to provide a novel and sophisticated use or application of a polypropylene having a specified crystallinity and Q value.

The present invention in two aspects has the following main compositions (1) and (3) and as embodiments thereof the compositions of (2) and (4):

(1) A polypropylene composition for acoustic vibration sheets, obtained by blending 100 parts by weight of a polypropylene having a crystallinity of 0.94 or more and a Q value of 10 or more with 1 to 15 parts by weight of a thermoplastic styrene block copolymer rubber.

(2) A polypropylene composition according to item (1) wherein 10 to 40 parts by weight of a filler is further blended with said polypropylene and said rubber.

(3) An acoustic vibration sheet obtained by molding a composition prepared by blending 100 parts by weight of a polypropylene having a crystallinity of 0.94 or more and a Q value of 10 or more with 1 to 15 parts by weight of a thermoplastic styrene block copolymer rubber.

(4) An acoustic vibration sheet according to item (3) wherein 10 to 40 parts by weight of a filler is further blended with said polypropylene and said rubber.

DETAILED DESCRIPTION OF PREFERRED EMBODIMENTS

The composition and effectiveness of the present invention will be described below in more detail.

Examples of polypropylene (polypropylene resin) used in the present invention are ① propylene homopolymer; ② crystalline copolymers of propylene with at least one kind of other α-olefins such as ethylene, butene-1,4-methylpentane-1, hexene-1, octene-1, etc. containing 50% by weight or more of propylene: ③ modified polypropylene resin obtained by subjecting 5.0% by weight or less (based on the total weight of the resin), of an unsaturated carboxylic acid such as acrylic acid, maleic anhydride, etc. graft-polymerized onto the polypropylene; and blends of any of two kinds or more of the above-mentioned ①, ② and ③.

When the composition of the present invention obtained by adding to such a polypropylene, a thermoplastic styrene block copolymer rubber as described below or further adding a filler to these, is subjected preferably to injection molding, the melt flow rate (hereinafter abbreviated to MFR) is preferred to be 5 g/10 min. or more. When the composition of the present invention is molded into a sheet which is then subjected to thermoforming such as vacuum forming, air-pressure forming, press molding, etc. to prepare the acoustic vibration sheet of the present invention, the MFR of the composition is preferred to be 5 g/10 min. or less. Further, the above-mentioned MFR values are also applicable to those of the polypropylene used in the present invetion.

In addition to the MFR value described above, the polypropylene used in the present invention must have a crystallinity and a Q value as described later.

The MFR value, crystallinity and Q value are characteristic values limiting the properties of the polypropylene (resin) used in the present invention. These three are physical properties, the values of which are independent of one another.

The crystallinity refers to a characteristic value indicating the degree of crystallizability of polymers and is usually measured by infrared spectroscopic analysis, nuclear magnetic resonance method or the like. As to the concrete measurement method of the infrared spectorscopic analysis, a test piece having a suitable thickness, e.g., 40 $\mu$m, is prepared from a sample and subjected to infrared spectroscopic analysis. The crystallinity refers to a value expressed in terms of the absorbance ratio (997 cm$^{-1}$/977 cm$^{-1}$) of the wave numbers of the resulting spectra at 977 cm$^{-1}$ and 977 cm$^{-1}$. The larger value means a higher crystallinity. Generally commercially available polypropylene resins (including polypropylene on which copolymerized products or modified products are based) have a crystallinity of about 0.85 to 0.92, whereas the polypropylene used in the present invention has a crystallinity of 0.94 or higher and such a polypropylene is produced using a particularly highly active catalyst and under limited polymerization conditions.

The Q value as one of the restricted physical properties of the polypropylene used in the present invention refers to a characteristic value indicating the molecular weight distribution of polymers and is expressed in terms of (Mw/Mn) wherein Mw refers to a weight-average molecular weight and Mn refers to a number-average molecular weight. The larger the ratio of these two, i.e., the Q value, the broader the molecular weight distribution.

Generally commercially available polypropylene resins have a Q value of about 4 to 7, whereas the polypropylene used in the present invention has a Q value of 10 or more. Such a polypropylene is produced under particular polymerization conditions such as multiple stage polymerization.

The polypropylene composition for acoustic vibration sheets, of the present invention is obtained by blending 1 to 15% by weight of a thermoplastic styrene block copolymer rubber as discussed below with the above-mentioned polypropylene or by further blending 10 to 40% by weight of a filler as discussed below with the above blend.

The acoustic vibration sheet of the present invention is obtained by molding the above-mentioned composition according to the molding process as discussed below.

In general, the main characteristics necessary for the acoustic vibration sheet of the present invention consist in the following ①, ② and ③:
① a large internal loss(tan δ),
② a high stiffness, and
③ a low specific gravity.

Acoustic vibration sheets of polypropylene basically possess the above characteristic ③. However, the sheet is still insufficient in the above characteristies ① and ②. The present inventors could have improved both the characteristics ① and ② with a leap by using a polypropylene having a Q value of 10 or more (note: as discussed above, generally commercially available products have a Q value of 4 to 7) relative to the characteristic ① and also by using a polypropylene having a crystallinity of 0.940 or more (note: as discussed above, generally commercially available products have a crystallinity of 0.85 to 0.92) relative to the characteristic ②, and also could have improved the adhesion of the acoustic vibration sheet to a large extent along with the improvement in the characteristic ① (Q value: 10 or more).

In addition, when the acoustic vibration sheet is practically used, a flexible material such as soft foamed urethane sheet is placed between the vibration sheet and a frame for fixing it and a material obtained by adhering the urethane sheet onto the vibration sheet is fixed onto the fixing frame. However, acoustic vibration sheets produced from general polypropylene resins are insufficient or inferior in the adhesion with the above flexible material.

The thermoplastic styrene block copolymer rubber to be blended in the composition of the present invention has no particular limitation, but for example styrene-butadiene-styrene block copolymer, styrene-isoprene-styrene copolymer and hydrogenated products thereof are suitable. These may be used alone or in admixtures of two kinds or more thereof. By blending the thermoplastic styrene copolymer rubber, the stiffness of the composition of the present invention is reduced, but its tan δ is improved. In addition, the tan δ of the thermoplastic styrene block copolymer rubber itself is smaller than those of the polypropylene resins, but when it is blended with the polypropylene resins, surprisingly enough the resulting tan δ is synergistically improved. Futher, by blending the copolymer rubber, it is possible to improve the adhesion and the high-impact properties. As to the improvement effect, the greater the Q value of the polypropylene resins used, the more remarkable the effect.

The blended quantity of the copolymer rubber used in the composition of the present invention is in the range of 1 to 15% by weight, preferably 3 to 10% by weight, based on the weight of the polypropylene resins. If the blended quantity is less than 1%, the improvement effects of the tan δ, adhesion and high-impact properties are small, while if it exceeds 15% by weight, reduction in the stiffness is large so that a practical problem is raised.

Although the kind of the filler blended in the composition of the present invention has no particular limitation, there may be exemplified mineral fillers such as talc, calcium carbonate, mica, magnesium phosphate, aluminum hydroxide, barium sulfate, calcium sulfate, calcium silicate, titanium oxide, potassium titanate, carbon graphite, silicon carbide, etc., fibrous fillers such as glass fibers, carbon fibers, etc. and cellulosic fillers such as wood flour, rice hull powder, pulp, etc. Among these fillers, talc, mica, carbon graphite, rice hull powder or carbon fibers may be particularly preferred for use. The size of these fillers is 300 μm or less, preferably 200 μm or less in particle diameter in the case of powdery materials and 6 mm or less, preferably 3 mm or less in the case of fibrous materials.

Although the quantity of these fillers blended has no particular limitation, usually it is in the range of 10 to 40% by weight, preferably 15 to 35% by weight based on the weight of the polypropylene resins. By blending the fillers, the stiffness and adhesion of the composition of the present invention are improved, but on the other hand, both the tan δ and high-impact properties thereof change toward undesirable directions. In view of the foregoing, the practical blended quantity is in the range of 10 to 40% by weight.

Other additive components may be blended with the polypropylene composition of the present invention, for example, additives such as various stabilizers, coloring agent, lubricant, anti-static agent, UV absorber, fire-retardant, copper damage-preventing agent, etc., or additive resins (or rubbers) such as polyethylene, rubbers other than styrene rubbbers, styrene synthetic resins, rosin, petroleum resin, etc. in a range of proportion wherein the object of the present invention is not harmed.

The composition of the present invention may be obtained by dry-blending the necessary components and if necessary, optional components, and successively, the acoustic vibration sheet of the present invention may be molded therefrom. However, it is more general and preferred to knead the above-mentioned components to be blended by means of a conventional kneader such as a mixing roll, bambury mixer, extruder, etc., to prepare a nearly uniform composition, which is then molded.

The thus obtained composition of the present invention may be directly molded into the acoustic vibration sheet according to injection molding, or may be extrusion-molded into a sheet, followed by successively forming the sheet into the vibration sheet of ultimate shape according to thermoforming method such as vacuum forming. Further, when the secondary processing is carried out, other stocks such as polyester film, paper, non-woven fabric, metallic foil, etc. may be laminated onto the above-mentioned sheet and the resulting laminates may be used as the acoustic vibration sheet.

Further, as an auxiliary means for improving the adhesion of the acoustic vibration sheet of the present invention, if the surface of the resulting molded product is in advance subjected to corona discharge treatment, flame treating or another generally known treatment, then inferior adhesion is difficult to occur at the time of adhesion of the surface onto soft foamed urethane sheet or lamination of various films onto the surface; hence such a treatment is desirable.

The present invention will be described in more detail by way of the following Examples.

EXAMPLES 1~14 AND COMPARATIVE EXAMPLES 1~11

As the polypropylene resin, a product having a melt flow rate of 1.0 g/10 min., a crystallinity of 0.950 or 0.960 and a Q value of 15 or 22 was used.

As the thermoplastic styrene block copolymer rubber, a product manufactured by Japan Synthetic Rubber Company (tradename: JSR. TR2000, styrene content: 40%) was used.

Further, as the filler, mica(average particle diameter: 140 μm, aspect ratio: 75), talc(average particle diameter: 2 μm), carbon graphite(average particle diameter: 4.5 μm) or wood flour(100 meshes pass) was used. These materials were blended in the proportions indicated in Table 1, followed by melt-extruding the resulting blends by means of an extruder of 40 m/mφ into pellets and making sheets therefrom according to the above-mentioned process.

As comparative examples, products having a melt flow rate of 1.0 g/10 min., but having crystallinities and/or Q values which do not satisfy those of the present invention, and products satisfying the present invention in the aspect of the polypropylene resin, but not satisfying the present invention in the aspect of blending were tested in the same manner as in Examples. The results are shown in Table 1 and Table 2. In addition, BHT(0.15PHR) and calcium stearate(0.20PHR) as stabilizers were blended with the respective blends. Further, the surface of the resulting sheets were subjected to flame treating and the resulting sheets were subjected to adhesion test.

As seen from Table 1, the compositions of the present invention are superior in the tan δ, stiffness (Young's modulus) and adhesion; are not particularly reduced in the aspect of the high-impact strength; are stabilized in the aspect of balance of the physical properties; and possess the necessary and improved characteristics for the acoustic vibration sheet.

TABLE 1

| Example | Characteristic values of polypropylene | | SBR (wt %) | Filler (wt %) | | | | Characteristic values of sheet | | | |
|---|---|---|---|---|---|---|---|---|---|---|---|
| | Crystallinity | Q value | | Talc | Mica | Carbon graphite | Wood flour | tan δ | Young's modulus (kg/mm$^2$) | Adhesion | High impact strength (kg-cm) |
| 1 | 0.950 | 15 | 3 | | | | | 0.082 | 124 | Δ | 9.0 |
| 2 | " | " | 5 | | | | | 0.083 | 121 | Δ | 11.5 |
| 3 | " | " | 10 | | | | | 0.087 | 118 | O | 18.8 |
| 4 | " | 22 | 5 | | | | | 0.085 | 120 | Δ | 11.9 |
| 5 | 0.960 | " | " | | | | | 0.088 | 129 | Δ | 10.7 |
| 6 | 0.950 | 15 | 5 | 20 | | | | 0.068 | 148 | O | 9.3 |
| 7 | " | " | " | | 20 | | | 0.071 | 165 | O | 8.1 |
| 8 | " | " | " | | | 20 | | 0.076 | 160 | O | 9.4 |
| 9 | " | " | " | | 30 | | | 0.065 | 187 | O | 7.0 |
| 10 | " | " | " | 15 | 15 | | | 0.063 | 174 | O | 7.4 |
| 11 | " | " | " | 15 | | 15 | | 0.066 | 164 | O | 8.0 |
| 12 | " | " | " | | 15 | 15 | | 0.070 | 183 | O | 7.6 |
| 13 | " | " | " | 10 | 10 | 10 | | 0.068 | 176 | O | 7.7 |
| 14 | " | " | " | | 20 | | 10 | 0.060 | 175 | O | 7.3 |

TABLE 2

| Compar. example | Characteristic values of polypropylene | | SBR (wt %) | Filler (wt %) | | | | Characteristic values of sheet | | | |
|---|---|---|---|---|---|---|---|---|---|---|---|
| | Crystallinity | Q value | | Talc | Mica | Carbon graphite | Wood flour | tan δ | Young's modulus (kg/mm$^2$) | Adhesion | High impact strength (kg-cm) |
| 1 | 0.880 | 5 | | | | | | 0.068 | 71 | X | 10.4 |
| 2 | " | 15 | | | | | | 0.074 | 69 | X | 10.6 |
| 3 | " | " | 5 | | | | | 0.081 | 65 | Δ | 15.7 |
| 4 | 0.950 | 5 | | | | | | 0.070 | 126 | X | 8.0 |
| 5 | " | " | 5 | | | | | 0.073 | 120 | X | 11.0 |
| 6 | 0.880 | 5 | | 20 | | | | 0.057 | 93 | X | 6.1 |
| 7 | " | " | 5 | 20 | | | | 0.062 | 87 | O | 8.8 |
| 8 | 0.950 | 15 | | | | | | 0.079 | 125 | X | 8.4 |
| 9 | " | " | | 20 | | | | 0.064 | 151 | X | 7.5 |
| 10 | " | " | 5 | 50 | | | | 0.046 | 183 | O | 4.5 |
| 11 | " | " | 20 | | | | | 0.086 | 96 | O | 2.7 |

What we claim is:

1. A polypropylene composition for acoustic vibration sheets consisting essentially of a blend of 100 parts by weight of a polypropylene having a crystallinity of 0.95 or more and a Q value of 15 or more and 1 to 15 parts by weight of a thermoplastic styrene block copolymer rubber.

2. An acoustic vibration sheet obtained by molding a composition consisting essentially of a blend of 100 parts by weight of a polypropylene having a crystallinity of 0.95 or more and a Q value of 15 or more with 1 to 15 parts by weight of a thermoplastic styrene block copolymer rubber.

3. A polypropylene composition for acoustic vibration sheets consisting essentially of a blend of 100 parts by weight of a polypropylene having a crystallinity of 0.95 or more and a Q value of 15 or more, 1 to 15 parts by weight of a thermoplastic styrene block copolymer rubber, and 10 to 40 parts by weight of a filler.

4. An acoustic vibration sheet obtained by molding a composition consisting essentially of a blend of 100 parts by weight of a polypropylene having a crystallinity of 0.95 or more and a Q value of 15 or more, 1 to 15 parts by weight of a thermoplastic styrene block copolymer rubber, and 10 to 40 parts by weight of a filler.

* * * * *